Patented Sept. 24, 1946

2,408,300

UNITED STATES PATENT OFFICE 2,408,300

HYDROLYSIS OF ALIPHATIC SULPHONYL CHLORIDES

Thomas Edward Dillon, New Castle, Del., assignor to E. I. du Pont de Nemours & Company, Wilmington, Del., a corporation of Delaware No Drawing. Application October 30, 1945, Serial No. 625,685

5 Claims. (Cl. 260—513)

This invention relates to a method for hydrolyzing organic sulphonyl chlorides. More particularly, this invention deals with a process for preparing aliphatic sulphonates by alkaline hydrolysis of aliphatic sulphonyl chlorides.

The mentioned aliphatic sulphonyl chlorides are generally prepared by reacting with a gaseous mixture of sulphur dioxide and chlorine or, alternatively with sulphuryl chloride and a catalyst, in the presence of actinic light, upon saturated aliphatic hydrocarbons having various chain lengths (from 4 to 50 carbon atoms) and being straight chained or branched. Numerous patents have issued describing and claiming these processes, among which the following may be mentioned as typical: Reed, Re. 20,968; Reed, 2,174,492; Fox et al., 2,174,506; Tinker et al., 2,174,507; Fox et al., 2,174,508; Lockwood et al., 2,193,824; Henke et al., 2,334,764; and Kharasch, 2,383,319.

The products of the above reaction are generally mono-, di- or poly-sulphonyl chlorides, often having one or more chlorine atoms attached directly to carbon atoms in the molecule.

The hydrolysis of the aforegoing compounds to the corresponding sulphonates has hitherto generally been achieved by reacting upon said sulphonyl chlorides with aqueous alkali, particularly aqueous caustic soda. Typical procedures for this purpose have been described in the above mentioned U. S. patents as well as in Reed, 2,174,110 and Reed, 2,276,090.

In U. S. Patent No. 2,319,121, a proposal has been made to employ alcohols as hydrolyzing agents.

The present invention is concerned primarily with the caustic alkali method of hydrolysis, and it is an object of this invention to improve said method in a general way, whereby to facilitate hydrolysis and to produce better quality products. Other and further important objects of this invention will appear as the description proceeds.

I have found that several distinct improvements, as more fully discussed below, are obtained if the hydrolysis of the above indicated organic sulphonyl chlorides is effected by the aid of aqueous alkali in the presence of a small quantity of an active organic nitrogenous base. By "active" I means that the base will readily form a salt with hydrogen chloride. By "small quantity" I mean any quantity less than that which would by itself suffice to effect hydrolysis of the given quantity of sulphonyl chloride, although in the more ordinary practice less than 20% of said limiting quantity would normally be employed.

I have found that the use of such auxiliary quantities of an active organic nitrogenous base has the effect of lowering the hydrolysis temperature, shortening the time of hydrolysis, preventing excessive foaming and decreasing the viscosity of the reaction mass. All of these factors together have the further effect of increasing the active-ingredient content of the product, inasmuch as decomposition or desulphonation of the product during the hydrolysis step is held by the above factors at a minimum. The said decomposition of the sulphonyl chloride appears to be a function of the temperature, and according to my invention, hydrolysis proceeds sufficiently rapidly at lower temperatures so that excessive decomposition is avoided.

In practice according to my invention, the sulphonylated reaction mass may be fed gradually into a mixture of the aqueous alkali and the selected nitrogenous base. Alternatively, a mixture of the nitrogenous base and the aqueous alkali may be fed slowly into the sulphonylation mass. A third option is to enter first the selected nitrogenous base into the sulphonylated reaction mass, and then add the aqueous alkali.

The temperature of the mass during the hydrolysis step may vary from room temperature to 120° C. or higher. But inasmuch as it is desirable to keep decomposition down to a minimum, it is preferred in practice to effect hydrolysis at as low a temperature as is consistent with good speed, say within a range of 70° to 105° C.

Without limiting my invention, the following examples are given to illustrate my preferred mode of operation. Parts mentioned are by weight.

Example 1

A mixture of 336 parts of $SO_2$ and 267 parts of chlorine was passed into 300 parts of molten refined paraffin wax (M. R. 120–122° F., A. S. T. M.) while the mass was agitated and exposed to actinic light as described in U. S. Re. 20,968.

The product was then hydrolyzed by adding gradually with agitation to a mixture of 262 parts of 50% aqueous sodium hydroxide solution and 7.5 parts of Solvent P (the commercially available mixture of mono-, di-, and tri-ethanolamines), maintained at a temperature between 85 and 90° C. The hydrolysis mass was noticeably thinner and smoother throughout than in a similar hydrolysis in absence of any amine. The reaction was also completed in a much shorter time, without foaming difficulty, and the product was obtained in better yield and quality.

Example 2

A mixture of 116 parts of $SO_2$ and 83 parts of $Cl_2$ was passed into 324 parts of No. 40 white oil in a manner similar to that described in Example 1. This oil is a saturated petroleum fraction of boiling range 265–300° C., sp. gr. 0.801 and Saybolt Universal Viscosity 36–37 sec. at 100° F.

The resulting product was hydrolyzed by adding gradually to 242 parts of an aqueous 30% sodium hydroxide solution containing 4 parts of morpholine, while maintaining the temperature at 75–85° C. The hydrolysis mass was further diluted with water until the unreacted oil separated. The latter was removed and the hydrolyzed product, after addition of sodium sulphate and borax, was evaporated to dryness on a drum dryer. Advantages similar to those described in Example 1 were found in having the amine present.

Example 3

A mixture of 95 parts of $SO_2$ and 76 parts of $Cl_2$ was passed into 270 parts of No. 30 white oil as previously described. This oil is a completely saturated petroleum fraction typically with a boiling range of 210–250° C., sp. gr. 0.781 and Saybolt Universal Viscosity of 32–33 sec. at 100° F.

The sulphonylated product was hydrolyzed as previously described with 365 parts of 20% aqueous NaOH containing 2 parts of monoethanolamine, while maintaining the temperature at 80–85° C. The mass was diluted so as to contain about 22% of active ingredient, the oil was separated and the aqueous product was used in this form. The hydrolysis proceeded smoothly in the presence of the monoethanolamine.

Example 4

A mixture of 106 parts of refined paraffin wax and 19 parts of petrolatum was treated with 88 parts of $SO_2$ and 49 parts of $Cl_2$ as previously described.

The hydrolysis was carried out with 125 parts of 50% aqueous NaOH in the presence of 5 parts of piperidine. The hydrolysis was started at room temperature and the temperature was allowed to rise to 70° C. during hydrolysis. The hydrolysis proceeded smoothly without formation of lumps and the product was a light cream colored paste ready for use.

Example 5

A mixture of 285 parts of refined paraffin wax and 0.97 parts of stearamide was heated to 70° C. and 428 parts of sulphuryl chloride was added over a period of 4 hours while irradiating with actinic light as described in U. S. 2,383,319.

To this mixture was added 15 parts of triethanolamine, then 192 parts of 65% aqueous NaOH was gradually added with agitation while maintaining the temperature in the range 85–95° C. The hydrolysis proceeded smoothly and rapidly, yielding a smooth cream colored paste.

Example 6

A mixture of 187 parts of $SO_2$ and 145 parts of $Cl_2$ was passed into 320 parts of "alkylation bottoms" with agitation and irradiation. The "alkylation bottoms" consists of a mixture of saturated branched chain hydrocarbons obtained as a byproduct from iso-octane manufacture; the product used had a boiling range of 190–210° C.

The product was hydrolyzed by adding gradually to 294 parts of 40% aqueous NaOH containing 9.6 parts of pyridine while maintaining the temperature in the range 95–105° C. The hydrolysis mass was diluted with alcohol and filtered, unreacted oil was separated and the concentration of the remaining mass was adjusted to 50% of active ingredient. The mass remained thin and smooth during the hydrolysis, with no foaming and a good yield of light colored product was obtained. Similar results were obtained by using 9.6 parts of trimethylamine in place of the pyridine.

It will be understood that the details in the above examples may be varied within wide limits, without departing from the spirit of this invention. Thus, the alkaline solution may be heated to 70°–80° C. prior to neutralization or may be at room temperature before beginning the addition of sulphonyl chloride.

In place of the nitrogenous bases named in the examples, many others may be used, for instance, pyridine, piperidine, picoline, mono-, di-, or tri-ethanolamine, morpholine, N-methyl morpholine, or diethyl-cyclohexyl amine. In general, it is believed that any nitrogen base which readily forms a hydrochloride salt will assist in the neutralization of the aliphatic sulphonyl chlorides.

For some uses the small amounts of amine left in the product may be objectionable if an amine with an unpleasant odor such as the methyl amines, pyridine, etc., is used as the hydrolysis catalyst. For such uses it is usually preferable to employ odorless amines such as the ethanol amines. On the other hand, the unpleasant smelling amines may be removed or chemically altered after the hydrolysis, in known manner such as by treatment with ethylene oxide, oxidation, etc. Similarly, aromatic amines may be objectionable where the product is to be used in personal contact.

The concentration of the amine used in catalyzing the hydrolysis may vary from .1% up to 15% or 20% of the theoretical quantity required for complete neutralization of the sulphonchloride. However, 1–3% on the weight of the sulphonylation mass has been found to produce the most desired effect at minimum cost.

As for the alkali, potassium hydroxide, calcium hydroxide, or other metallic hydroxides which react with sulphonyl chlorides may be used for neutralization in lieu of sodium hydroxide. In actual practice, however, sodium hydroxide is probably the only one that would normally be used. The concentration of the alkali may vary appreciably, say from 20% to 65%, as illustrated by the above examples.

The effects produced when using the auxiliary amines during hydrolysis are more noticeable when di-, and polysulphonates are being hydrolyzed.

In general, all aliphatic hydrocarbon sulphonyl chlorides may be neutralized in this manner.

The advantages of my invention may now be summarized as follows: The amine catalyst keeps the hydrolysis mass thin throughout and prevents formation and development of local acidity. Such local acidity causes desulphonylation which results in troublesome foaming of the hydrolysis mass as well as loss in yield. With a given degree of agitation and a given temperature the time of hydrolysis is considerably shortened, reducing the cost of the product by increasing the capacity of the equipment; alternatively, the same reaction time may be achieved at a lower temperature. The disadvantage of increasing temperature to reduce the reaction time, rather than using the catalyst, is that desulphonylation increases with increasing temperature and this reduces yield and quality of product. Also, although the hydrolysis is improved by improving the agitation such improvement is often limited by the tendency to foam. When proceeding according to my invention, the tendency to foam is considerably reduced.

I claim as my invention:

1. In the process of hydrolyzing an aliphatic sulphonyl chloride by reacting upon the same with aqueous caustic alkali, the improvement which consists in effecting the reaction in the presence of an organic nitrogenous base.

2. A process of hydrolyzing an aliphatic sulphonyl chloride to produce a salt of the coresyponding sulphonic acid, which comprises reacting upon said sulphonyl chloride with a mixture of a caustic alkali and an organic nitrogenous base in an aqueous medium.

3. A process of hydrolyzing an aliphatic sulphonyl chloride to produce a salt of the corresponding sulphonic acid, which comprises reacting upon said sulphonyl chloride with an aqueous solution of a caustic alkali in quantity substantially equal to that theoretically required for complete hydrolysis and in the presence of less than the stoichiometric quantity of an organic nitrogenous base which is sufficiently basic to form a salt with hydrogen chloride.

4. A process of hydrolyzing an aliphatic sulphonyl chloride to produce a salt of the corresponding sulphonic acid, which comprises reacting upon said sulphonyl chloride with aqueous caustic alkali in quantity substantially sufficient to effect by itself the desired hydrolysis, said aqueous alkali containing further a quantity of an organic nitrogenous base corresponding in molar proportion to not over 20% of the quantity of the caustic alkali employed.

5. The process of hydrolyzing an aliphatic sulphonyl chloride to produce the corresponding sodium sulphonate, which comprises entering said organic sulphonyl chloride, at a temperature of about 80° to 100° C., into an aqueous solution of sodium hydroxide of 30% to 50% strength and containing a quantity of an organic nitrogenous base corresponding to from 1% to 3% by weight of the organic sulphonyl chloride to be treated.

THOMAS EDWARD DILLON.